(12) United States Patent
Anderson et al.

(10) Patent No.: US 10,638,664 B2
(45) Date of Patent: May 5, 2020

(54) TOOL BAR MOUNTED FOLDING WING MOWER APPARATUS

(71) Applicant: Bourgault Industries Ltd., St. Brieux (CA)

(72) Inventors: Edward Scott Anderson, Humboldt (SK); Robert Cochran, Saskatoon (SK)

(73) Assignee: Bourgault Industries Ltd., Saint Brieux (CA)

( * ) Notice: Subject to any disclaimer, the term of this patent is extended or adjusted under 35 U.S.C. 154(b) by 144 days.

(21) Appl. No.: 15/789,135

(22) Filed: Oct. 20, 2017

(65) Prior Publication Data
US 2018/0263169 A1    Sep. 20, 2018

(30) Foreign Application Priority Data
Mar. 20, 2017    (CA) .................................... 2961482

(51) Int. Cl.
| | | |
|---|---|---|
| *A01D 75/30* | (2006.01) | |
| *A01D 34/66* | (2006.01) | |
| *A01B 73/06* | (2006.01) | |
| *A01B 73/04* | (2006.01) | |
| *A01D 34/73* | (2006.01) | |

(52) U.S. Cl.
CPC .......... *A01D 75/306* (2013.01); *A01B 73/048* (2013.01); *A01B 73/067* (2013.01); *A01D 34/66* (2013.01); *A01D 34/661* (2013.01); *A01D 34/736* (2013.01); *A01D 75/303* (2013.01)

(58) Field of Classification Search
CPC ............... A01B 73/067; A01B 73/048; A01B 23/04–046; A01D 34/66; A01D 34/736; A01D 34/661; A01D 75/30–306

USPC ................................................................ 56/6
See application file for complete search history.

(56) References Cited

U.S. PATENT DOCUMENTS

| | | | |
|---|---|---|---|
| 3,070,938 A | | 1/1963 | Winget |
| 3,982,773 A | * | 9/1976 | Stufflebeam .......... A01B 73/067 |
| | | | 280/656 |
| 4,418,762 A | * | 12/1983 | Page ...................... A01B 73/02 |
| | | | 172/311 |

(Continued)

FOREIGN PATENT DOCUMENTS

| | | | | |
|---|---|---|---|---|
| CA | 2947317 A1 | * | 12/2017 | ............. A01B 73/00 |
| EP | 2042025 A1 | | 1/2009 | |

OTHER PUBLICATIONS

Examiner Requisition Notice from Canadian Application No. 2,961,482; dated Mar. 21, 2018, 4 pgs.

*Primary Examiner* — Alicia Torres
*Assistant Examiner* — Adam J Behrens
(74) *Attorney, Agent, or Firm* — Moss & Barnett; Michael A. Bondi

(57) ABSTRACT

A mower apparatus has a tool bar mounted on wheels has a center section and right and left wing sections pivotally attached to the center section. When the tool bar is in an operating position the wing sections extend laterally from the center section perpendicular to the operating travel direction, and in a transport position the wing sections extend rearward or forward from the center section. A plurality of mowing units is attached to the tool bar such that when the tool bar is in the operating position each mowing unit extends rearward from the tool bar, and when the tool bar is in the transport position each mowing unit extends upward from the tool bar.

8 Claims, 8 Drawing Sheets

(56) References Cited

U.S. PATENT DOCUMENTS

| | | | |
|---|---|---|---|
| 4,697,404 A * | 10/1987 | Brockmeier | A01D 75/30 |
| | | | 172/308 |
| 4,821,809 A | 4/1989 | Summach | |
| 5,113,640 A | 5/1992 | Colistro | |
| 6,131,378 A * | 10/2000 | Lees | A01D 75/303 |
| | | | 56/13.6 |
| 6,241,025 B1 * | 6/2001 | Myers | A01B 35/28 |
| | | | 172/21 |
| 7,581,597 B2 | 9/2009 | Neudorf | |
| 7,861,795 B2 * | 1/2011 | Dillon | A01B 73/02 |
| | | | 172/311 |
| 8,209,946 B2 * | 7/2012 | Neudorf | A01D 34/661 |
| | | | 172/240 |
| 9,351,437 B2 | 5/2016 | Friesen | |
| 9,955,624 B2 * | 5/2018 | Sammut | A01B 73/067 |
| 10,375,891 B2 * | 8/2019 | Martin | A01D 34/006 |
| 2004/0148917 A1 | 8/2004 | Eastwood | |
| 2016/0150718 A1 * | 6/2016 | Van Loen | A01B 73/046 |
| | | | 56/7 |
| 2017/0127614 A1 * | 5/2017 | Button | A01D 34/005 |
| 2019/0082588 A1 * | 3/2019 | Van De Sluis | A01D 34/44 |

\* cited by examiner

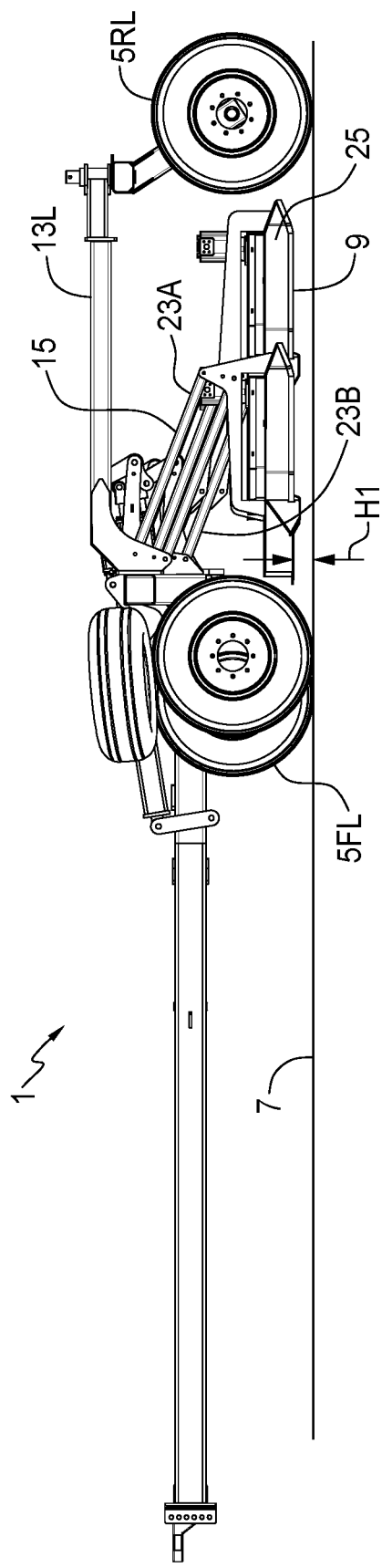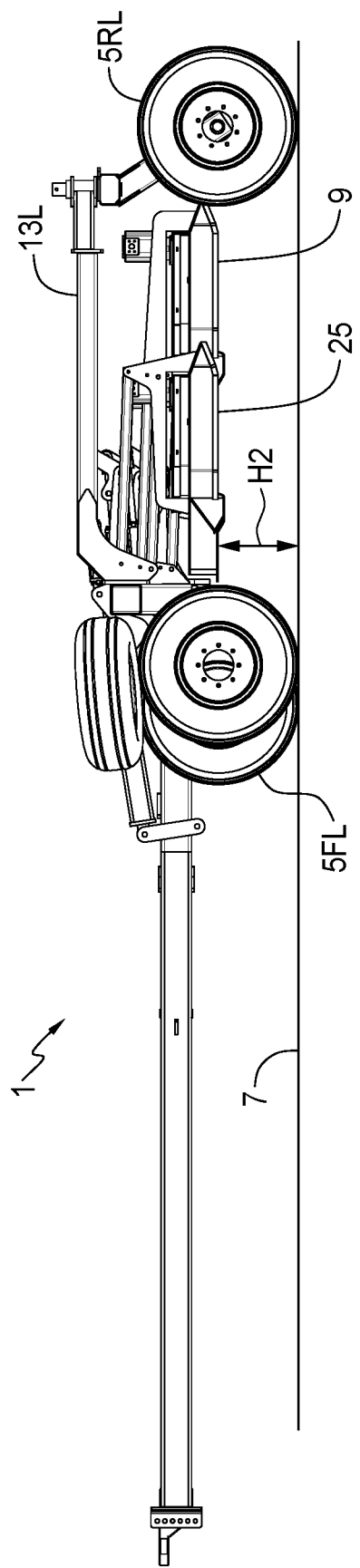

TOOL BAR MOUNTED FOLDING WING MOWER APPARATUS

REFERENCE TO RELATED APPLICATION

This application claims priority to Canadian Applic. No. Ser. No. 2,961,482, filed on Mar. 20, 2017, the contents of which are incorporated herein by reference.

SUMMARY

This disclosure relates to the field of mowing implements and in particular a mowing implement with decks mounted on a tool bar wings that fold rearward or forward for transport.

BACKGROUND

Typical rotary mowers have a horizontally oriented mower deck mounted on wheels for movement along the ground and a horizontally oriented rotating blade mounted under the deck and driven by a gearbox mounted on the deck and connected to the power take-off of a towing tractor.

Wider rotary mowers typically include a center deck with right and left wing decks pivotally attached to the center deck about horizontal wing pivot axes oriented substantially in alignment with an operating travel direction of the mower. One or more rotating blades is mounted under each deck. In such mowers with multiple blades the blades overlap somewhat so that vegetation across the entire width of the mower is cut. Typically each blade is mounted forward or rearward of adjacent blades so that the circle described by the path of one blade extends laterally beyond the circular path of the adjacent blade.

For transport the wing decks can be pivoted up about the wing pivot axes to a generally vertical transport position. U.S. Pat. No. 5,113,640 to Colistro discloses such a mower apparatus.

U.S. Pat. No. 8,209,946 to Neudorf et al. discloses very wide a mower apparatus with a center mower deck, inner wing decks attached to sides of the center deck and outer wing decks attached in turn to outer edges of the inner wing decks. For transport front ends of the wing decks move upward and then the wing decks trail rearward.

U.S. Pat. No. 3,070,938 to Winget discloses a frame with a plurality of individual mower units, each comprising a mower deck mounted on wheels and a rotating blade under the deck. The mower assemblies are mounted on a laterally extending frame with wings that raise vertically for transport. To avoid the usual problems with tractor driven mechanical drivelines each mower is driven electrically by a tractor driven generator.

United States Published Patent Application Number 2004/0148917 of Eastwood discloses a system similar to that of Winget, with individual electric driven mower units attached to a laterally extending tool bar.

Ground engaging tools such as harrows, packers, and the like are typically mounted on tool bars with wing sections that extend laterally perpendicular to the operating travel direction when in the operating position, and then trail rearward when in the transport position. U.S. Pat. No. 4,821,809 to Summach and U.S. Pat. No. 9,351,437 to Friesen et al. disclose different versions of such tool bars. These tool bars are rotated from a first orientation where the ground engaging tools attached thereto extend rearward and engage the ground, to a second orientation where the ground engaging tools attached thereto extend upward such that the wings may be moved to the rearward trailing transport position. As a further option known in the art, U.S. Pat. No. 7,581,597 to Neudorf et al. discloses instead to fold the wings forward instead of rearward for transport.

SUMMARY OF THE INVENTION

The present disclosure provides a mower apparatus that overcomes problems in the prior art. In the wide wing type mowers of the prior art the wings fold upward providing access for maintenance and repair of the mowing mechanism under the wing decks, however the center section of the mower remains on the ground. Maintenance and repair of the mowing mechanism under the decks of the center section thus requires jacking or otherwise raising the center decks to provide access. Further when operating such mowers debris collects on top of the mower decks where same can interfere with drive lines etc. and also present a fire hazard.

In the presently disclosed mower apparatus all the mowing units move to a vertical transport position where the mowing mechanisms are accessible. Also conveniently, debris collected on top of the decks during operation in the operating position falls off when the mowing units are moved to the transport position.

The present disclosure provides a mower apparatus comprising a tool bar supported on wheels for travel over a ground surface in an operating travel direction. The tool bar comprising a center section and right and left wing sections pivotally attached to corresponding right and left sides of the center section. When the tool bar is in an operating position the wing sections extend laterally from the center section substantially perpendicular to the operating travel direction, and when the tool bar is in a transport position the wing sections extend rearward or forward from the center section. A plurality of mowing units is attached to the tool bar and when the tool bar is in the operating position each mowing unit extends rearward from the tool bar, and when the tool bar is in the transport position each mowing unit extends upward from the tool bar.

The present disclosure provides a mower apparatus with a plurality of mower units laterally spaced along a tool bar to provide a wide cutting path. Conveniently the bottom of each mowing unit is exposed at a relatively low location when the mowing units are moved to the transport position. Thus the mower parts typically hidden under the center section of a conventional wing type mower are accessible for any repairs, maintenance, cleaning or the like that may be required. Further when the mowing units are moved to the transport position debris that has gathered on the top of the mowing units during operation will tend to fall off onto the ground.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 4 is a side view of the embodiment of FIG. 1 with the mowing units at a low cutting height above the ground.

FIG. 5 is a side view of the embodiment of FIG. 1 with the mowing units in a high cutting height above the ground.

DETAILED DESCRIPTION OF THE ILLUSTRATED EMBODIMENTS

FIGS. 1-7 illustrate an embodiment of a mower apparatus 1 of the present disclosure. The mower apparatus 1 comprises a tool bar 3 supported on wheels 5 for travel over a ground surface 7 in an operating travel direction T.

The tool bar 3 comprises a center section 3C and right and left wing sections 3R, 3L pivotally attached to corresponding right and left sides of the center section 3C. When the tool bar 3 is in the operating position of FIG. 1 the wing sections 3R, 3L extend laterally from the center section 3C substantially perpendicular to the operating travel direction T, and when the tool bar 3 is in the transport position of FIG. 3 the wing sections 3R, 3L extend rearward from the center section 3C.

Figure 3:
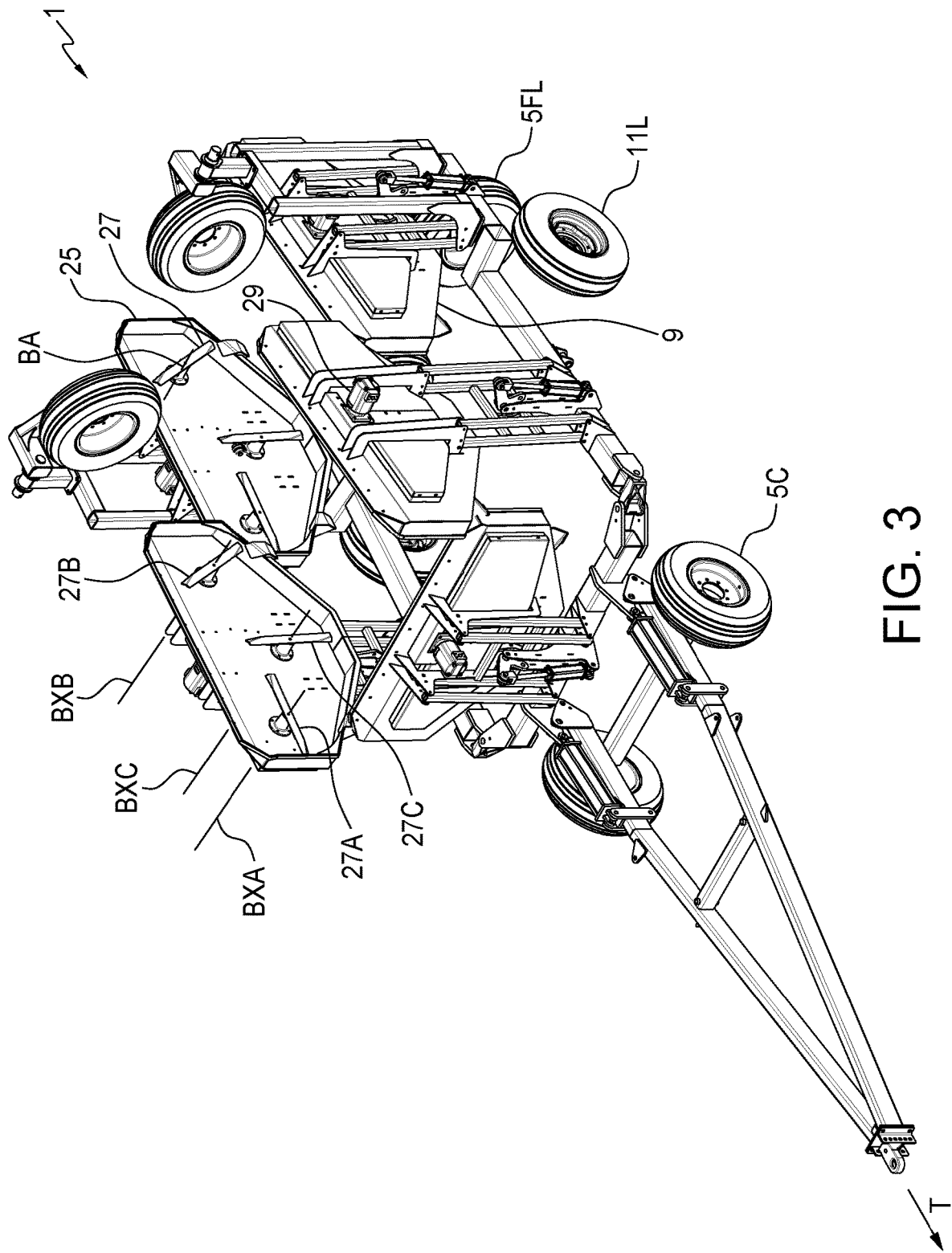
FIG. 3 is a perspective view of the embodiment of FIG. 1 in the transport position with the mowing units extending upward from the tool bar, and the wing sections folded back from the intermediate position of FIG. 2.
Figure 6:
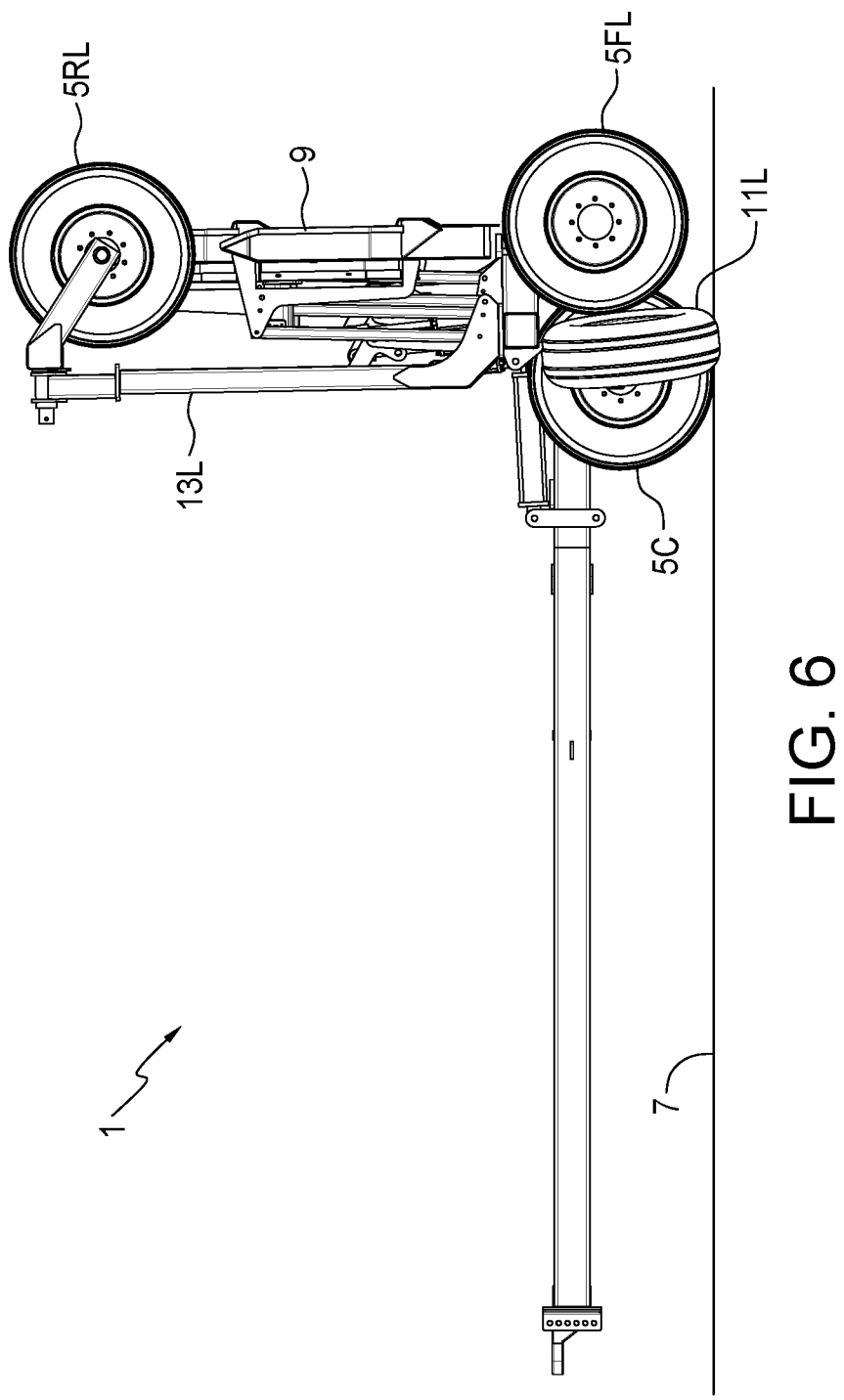
FIG. 6 is a side view of the embodiment of FIG. 1 in the intermediate position shown in FIG. 2.
Figures 7, 8:
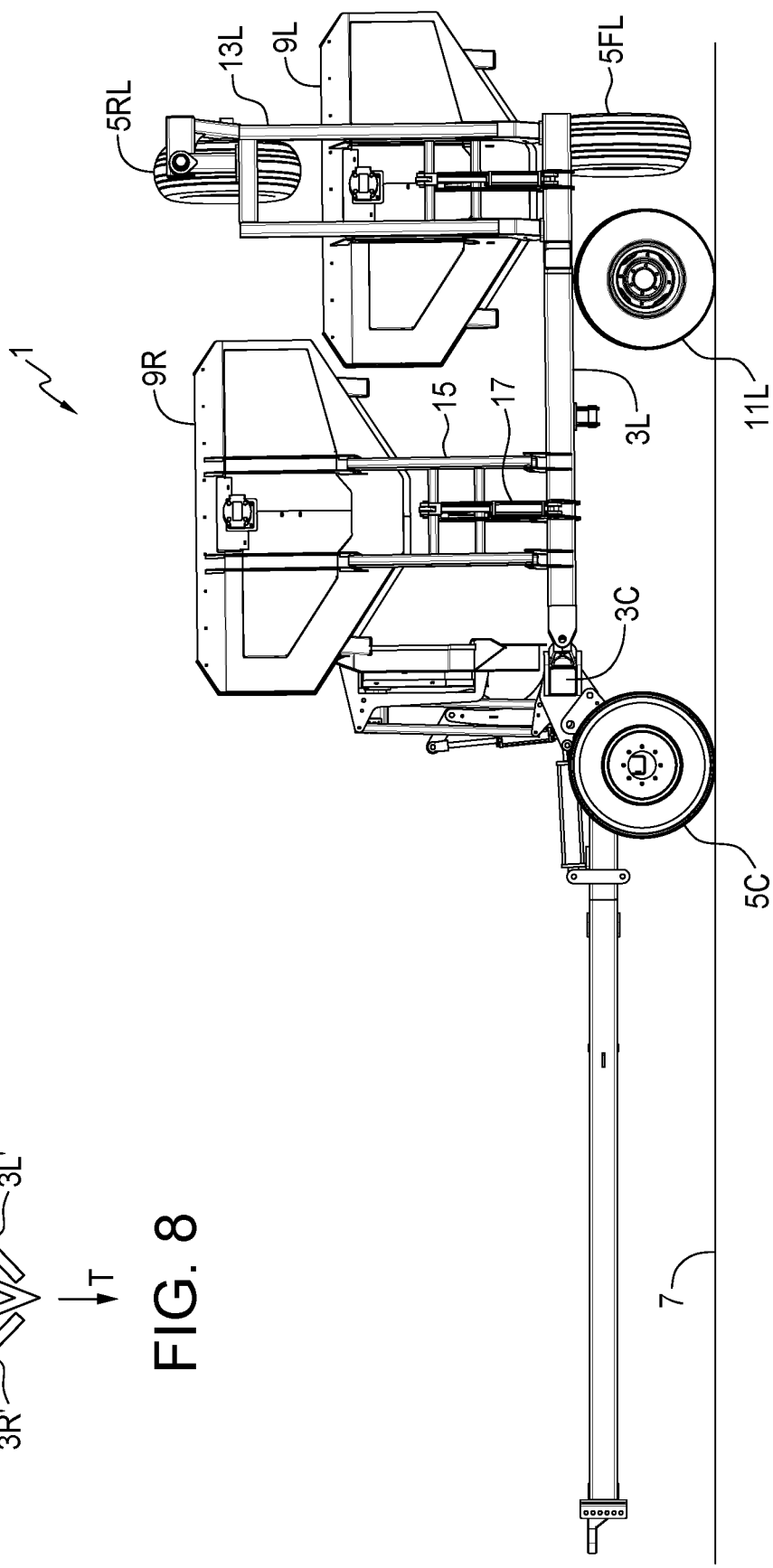
FIG. 7 is a side view of the embodiment of FIG. 1 in the transport position shown in FIG. 3.
FIG. 8 schematically illustrates a top view of an alternate tool bar where the wing sections extend forward when in the transport position.

While it is contemplated that more commonly the wing sections 3R, 3L will fold rearward as shown in FIG. 3, FIG. 8 schematically illustrates an alternate arrangement of the tool bar 3' where the wing sections 3R', 3L' extend forward from the center section 3C'. The illustrated apparatus 1 also has a conventional hitch extending forward for connection to a tractor draw bar, however it is also contemplated that the mower apparatus 1 could be configured to mount to the three point hitch of a tractor as well.

Mowing units 9 are attached side by side to the tool bar 3 such that the mowing units 9 overlap, with a path of each mowing unit 9 extending laterally into the path of an adjacent mowing unit 9. Thus the path P1 of a front mowing unit 9F overlaps the path P2 of the next adjacent rear mowing unit 9R such that plant material across the entire width of the apparatus 1 is cut.

Figure 1:
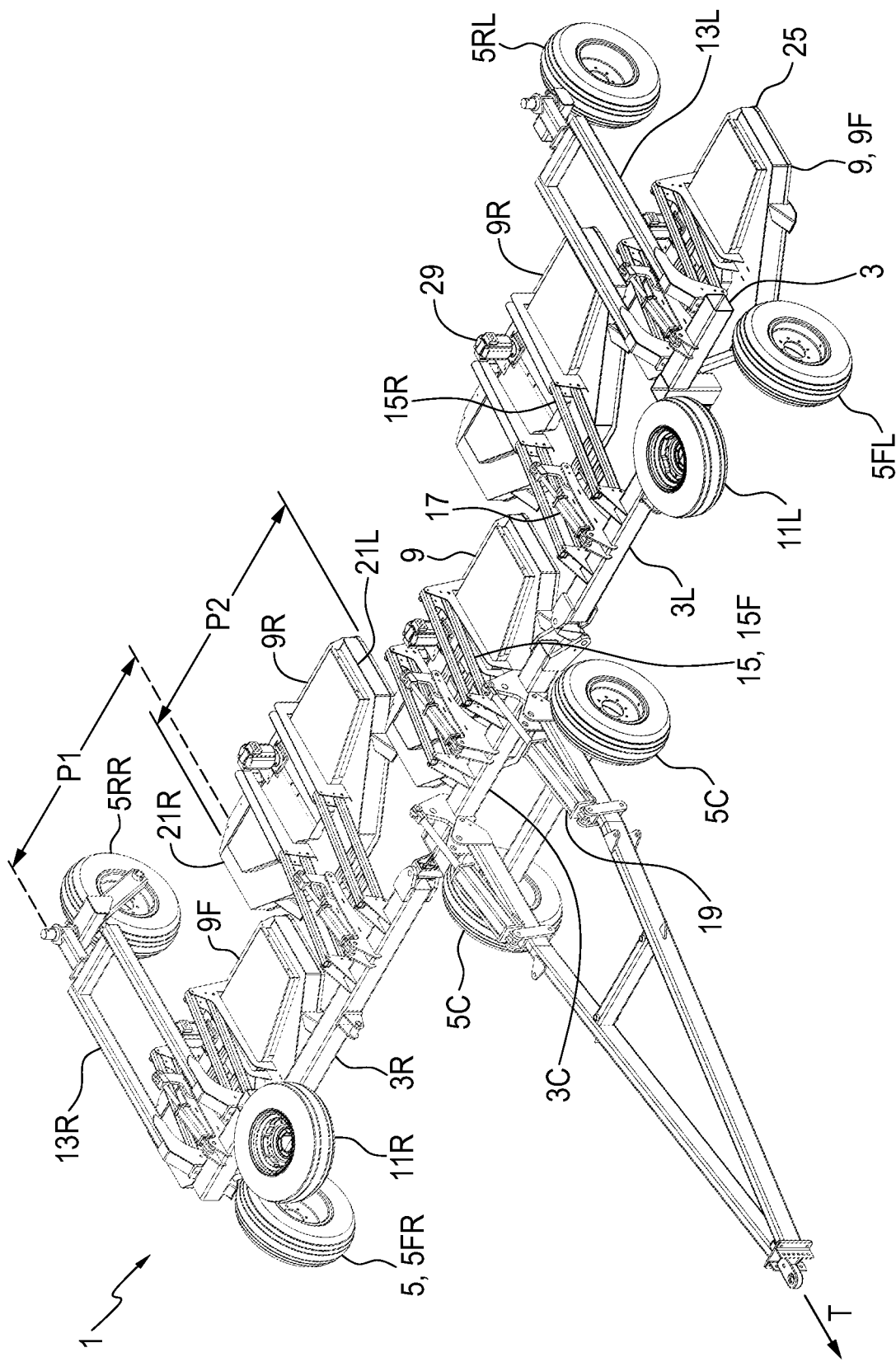
FIG. 1 is a perspective view of an embodiment of the mower apparatus of the present disclosure in the operating position with the mowing units extending rearward from the tool bar.
Figure 2:
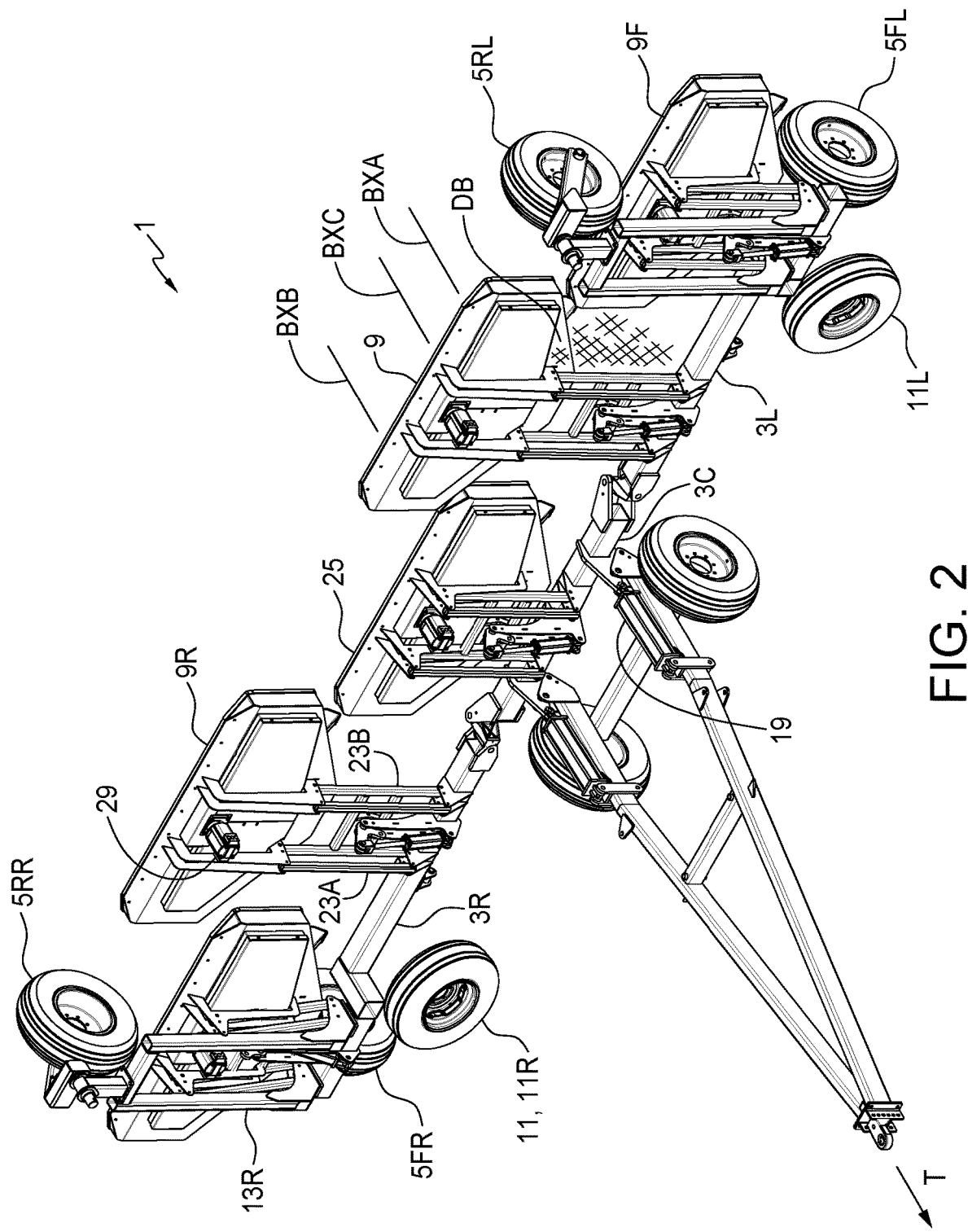
FIG. 2 is a perspective view of the embodiment of FIG. 1 in an intermediate position with the mowing units extending upward from the tool bar.

FIG. 1 shows the tool bar 3 in the operating position for mowing operations. FIG. 2 shows the tool bar 3 in an intermediate position where the tool bar 3 has been rotated by the hitch hydraulic cylinders 19 to move the mowing units to a position extending upward from the tool bar 3 and where the tool bar 3 moves from being supported on the center wheels 5C and front wheels 5FR, 5FL to being supported on the center wheels 5C and right and left transport wheels 11R, 11L as is known in the art. FIG. 3 shows the tool bar in the transport position where the wing sections 3R, 3L have been folded back from the intermediate position of FIG. 2 to the transport position where the transport wheels 11 are aligned with the operating travel direction T. Thus when the tool bar 3 is in the operating position of FIG. 1 each mowing unit 9 extends rearward from the tool bar 3, and when the tool bar 3 is in the transport position of FIG. 3 each mowing unit 9 extends upward from the tool bar.

It can be seen that in contrast to the prior art where the center mower section remains in the horizontal cutting orientation, with the present apparatus 1 in the intermediate or transport positions the bottom of each mowing unit 9 is exposed and easily accessible for any repairs, maintenance, cleaning or the like that may be required. Also the mowing units 9 are all the same, relatively short, distance above the ground in contrast to some of the larger wing mowers where the bottom of outer wing mowing units may be exposed but are a significant distance above the ground making access more difficult.

Further it may be seen in FIG. 2 that when the tool bar 3 moves to the intermediate position, debris DB that has gathered on the top of the mowing units 9 will tend to fall off onto the ground.

The illustrated tool bar 3 is of the type illustrated in U.S. Pat. No. 4,821,809 to Summach where the tool bar 3 is rotated from the operating position to the intermediate position, and the tool bar moves from being supported on the front wheels 5FR, 5FL to being supported on the transport wheel 11. It is contemplated that a tool bar such as illustrated in in U.S. Pat. No. 9,351,437 to Friesen, where the same wheels support the tool bar in the operating position and transport position, could be used as well.

As best seen in FIGS. 4 and 5 each illustrated mowing unit 9 is maintained at a vertical position that is above and out of contact with the ground surface 7 when the tool bar 3 is in the illustrated operating position. In the illustrated apparatus 1, right and left front wheels 5FR, 5FL support the tool bar 3 at a fixed vertical position with respect to the ground surface 7 when the tool bar 3 is in the operating position, and right and left rear wheels 5RR, 5RL are mounted on corresponding right and left wheel arms 13R, 13L fixed to corresponding right and left wing sections 3R, 3L of the tool bar 3 and extending rearward from the tool bar 3.

Where such a tool bar 3 is used to support ground engaging tools such as harrows, packers and the like the weight of the tools is essentially supported by the ground. The weight of the mowing units 9 of the illustrated apparatus 1 is not supported on the ground and tends to rotate the tool bar 3 and the right and left rear wheels 5RR, 5RL prevent rotation of the tool bar 3 and support that weight and maintain the mower units 9 off the ground supported only by the tool bar 3.

The vertical position of each mowing unit 9 with respect to the ground surface 7 is adjustable when the tool bar 3 is in the operating position to adjust the cutting height of the mowing units 9. In the illustrated apparatus 1, each mowing unit 9 is attached to the tool bar 3 by a rearward extending arm assembly 15 that is pivotally attached to the tool bar 3 at a front end thereof and an arm actuator 17 is operative to pivot each arm assembly 15 up and down with respect to the tool bar 3 to adjust a vertical position of each mowing unit 9 with respect to the ground surface 7 from a low cutting height H1 shown in FIG. 4 to a high cutting height H2 shown in FIG. 5. The mowing unit 9 remains horizontal when moving from the low to the high cutting height.

It is contemplated that each mowing unit 9 could also have a wheel or wheels supporting the rear end thereof however such a mower support wheel would need to provide somehow for adjusting the cutting height. The illustrated mowing units 9 with no supporting wheels are economical to manufacture and relatively light weight, and the cutting height is easily adjusted as described above.

As illustrated in FIG. 1, right and left outer edges 21R, 21L of rear mowing units 9R are rearward of adjacent front mowing units 9F to achieve the desired overlap. Each rear mowing unit 9R is attached to the tool bar 3 by a rear arm assembly 15R and each front mowing unit 9F is attached to the tool bar 3 by a front arm assembly 15F, and the rear arm assemblies 15R are longer than the front arm assemblies 15F to achieve the desired fore and aft relationship of the adjacent mowing units 9.

The front and rear arm assemblies 15 include parallel upper and lower links 23A, 23B configured such that the mowing units 9 are maintained at a desired level orientation as the arm assemblies 15 move up and down as shown in FIGS. 4 and 5.

In the illustrated apparatus 1 each mowing unit 9 is provided by a rotary mower comprising a mower deck 25, a mower blade 27 rotatably mounted under the mower deck 25 about a blade axis BX extending down from the mower deck 25, and a mower drive 29 operative to rotate the mower blade 27. It is contemplated that a hydraulic or electric motor, driven by a corresponding hydraulic pump or electric generator mounted on the hitch would economically provide a simple mower drive 29.

Each mower deck 25 extends substantially horizontally rearward from the tool bar 3 above the mower blade 27 when the tool bar 3 is in the operating position of FIG. 1, and each mower deck 25 extends upward from the tool bar 3 when the tool bar 3 is in the intermediate position of FIG. 2 or the transport position of FIG. 3.

In the illustrated apparatus 1 each rotary mower comprises first, second, and third mower blades 27A, 27B, 27C rotatably mounted under the mower deck about corresponding first, second, and third blade axes BXA, BXB, BXC extending down from the mower deck 25, and when the tool bar 3 is in the operating position the first and second blade axes BXA, BAB are side by side an equal distance rearward of the tool bar 3 and the third blade axis BXC is forward of the first and second blade axes BXA, BXB. The cutting path of the third mower blade 27C overlaps the cutting path of the first and second mower blades 27A, 27B.

Figure 9:
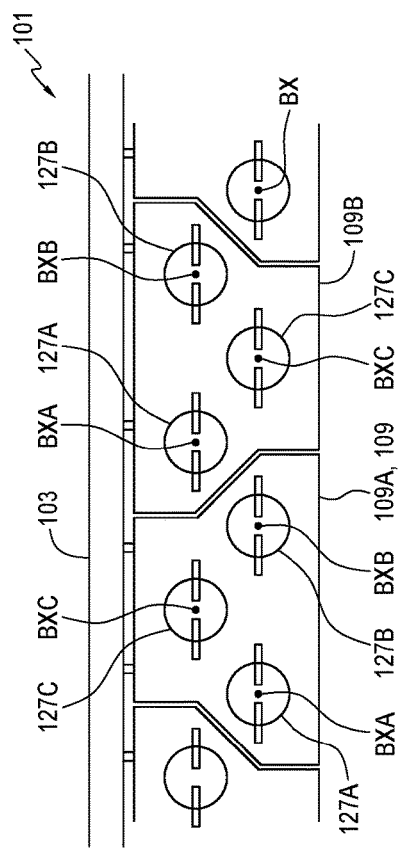
FIG. 9 is a schematic bottom view of an alternate mower apparatus where the three bladed mowing units are arranged alternately along the tool bar.

FIG. 9 schematically illustrates a bottom view of an alternate apparatus 101 with three blade mower units 109 attached the a tool bar 103 such that a first mower unit 109A has the third blade axis BXC and blade 127C forward of the first and second blade axes BXA, BXB and blades 127A, 127B, and the adjacent second mower unit 109B has the third blade axis BXC and blade 127C rearward of the first and second blade axes BXA, BXB and blades 127A, 127B. This arrangement could allow the mowing units 109 to be arranged close together and aligned across the width of the tool bar 103 while still providing the required overlap.

Figure 10:
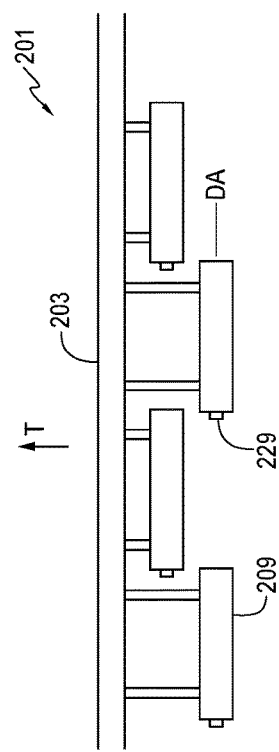
FIG. 10 is a schematic top view of an alternate mowing apparatus where the mowing units are provided by flail mowers.
Figure 11:
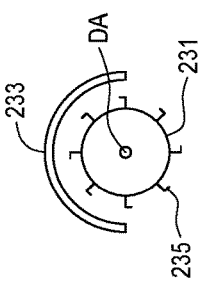
FIG. 11 is a schematic sectional side view of the flail mowers of FIG. 10.

FIG. 10 schematically illustrates a top view of a further alternate apparatus 201 where each mowing unit 209 is provided by a flail mower comprising, as shown in FIG. 11, a flail drum 231 rotatably mounted about a drum axis DA oriented substantially horizontally and perpendicular to the operating travel direction T when the tool bar 203 is in the illustrated operating position, and a drum cover 233. Flails 235 are pivotally attached to the outer surface of the drum 231, and a drive 229 rotates the drum 231 as is known in the art. Again the mower units 209 are arranged in alternating forward and rearward relationship to provide the required overlap.

Figure 12:
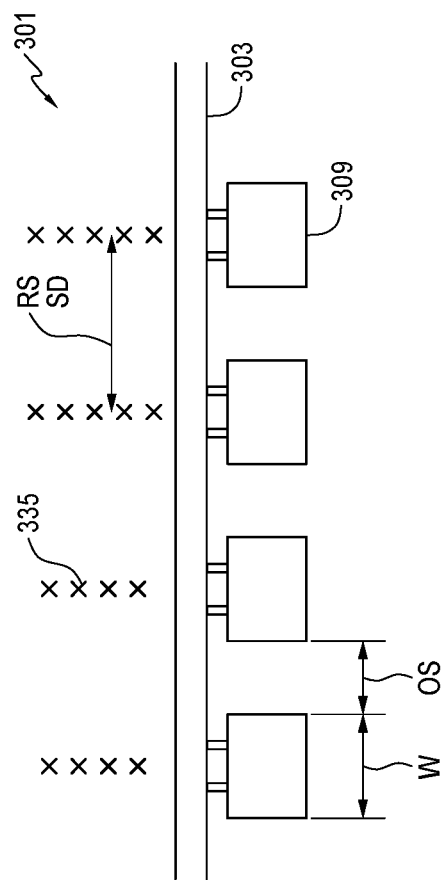
FIG. 12 schematically illustrates a top view of an alternate apparatus where the mowing units are spaced apart across the width of the tool bar, such as for use with row crops.

In some mowing applications, such as when cutting residue from row crops like cotton, it is not necessary to provide mowing across the entire width of the tool bar. FIG. 12 schematically illustrates an alternate apparatus 301 where the mowing units 309 are attached to the tool bar 303 at a spacing distance SD configured such that an open space OS is present between each mowing unit 309. The spacing distance SD is selected to correspond to a desired row crop spacing RS of a crop 335 where residue is to be cut. The width W of the mowing units 309 will be selected based on the width of cut required to satisfactorily mow the width of residue left by a particular crop.

With narrower mowing units 309 and less actual cutting width, the apparatus 301 will be less costly to manufacture and have reduced power requirements compared to a mowing apparatus that cuts the full width of the apparatus.

The present disclosure provides a mower apparatus 1, 101, 201 where, when the mowing units 9, 109, 209 are moved to the intermediate position, the bottom of each mowing unit 9, 109, 209 is exposed at a relatively low location above the ground surface 7 where the blades 27, flails, 235, drums 231, and like mower parts are accessible for any repairs, maintenance, cleaning or the like that may be required. Further when the mowing units 9 are moved to the intermediate position, the disclosed apparatus 1 provides essentially self-cleaning mower decks 25 and covers 233 where debris DB that has gathered on the top of the mowing units 9 will tend to fall off onto the ground.

The mower apparatus 1 can also be made in wide versions in the manner of conventional harrow and packer implements which are often 50, 60, or more feet wide. A limiting factor will of course be the power required to drive the total number of mowing units mounted on the tool bar.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:
1. A mower apparatus comprising: a tool bar supported on wheels for travel over a ground surface in an operating travel direction;
 the tool bar comprising a center section and right and left wing sections pivotally attached to corresponding right and left sides of the center section;
 wherein when the tool bar is in an operating position the wing sections extend laterally from the center section substantially perpendicular to the operating travel direction, and when the tool bar is in a transport position the wing sections extend rearward or forward from the center section;
 a plurality of mowing units attached to the tool bar;
 wherein when the tool bar is in the operating position each mowing unit extends rearward from the tool bar, and when the tool bar is in the transport position each mowing unit extends upward from the tool bar;
 wherein each mowing unit is maintained at a vertical position that is above and out of contact with the ground surface when the tool bar is in the operating position;

wherein the vertical position of each mowing unit with respect to the ground surface is adjustable when the tool bar is in the operating position;

right and left front wheels supporting the tool bar at a substantially fixed vertical position with respect to the ground surface when the tool bar is in the operating position, and right and left rear wheels mounted on corresponding right and left wheel arms fixed to corresponding right and left wing sections of the tool bar and extending rearward from the tool bar;

wherein each mowing unit is attached to the tool bar by a rearward extending arm assembly pivotally attached to the tool bar at a front end thereof and an arm actuator is operative to pivot each arm assembly up and down with respect to the tool bar to adjust the vertical position of each mowing unit with respect to the ground surface; and wherein the mowing units are attached to the tool bar such that the mowing units overlap, with a path of each mowing unit extending laterally into the path of an adjacent mowing unit.

2. The apparatus of claim 1 wherein right and left outer edges of rear mowing units are rearward of adjacent front mowing units.

3. The apparatus of claim 2 wherein each rear mowing unit is attached to the tool bar by a rear arm assembly, each front mowing unit is attached to the tool bar by a front arm assembly, and wherein the rear arm assemblies are longer than the front arm assemblies.

4. The apparatus of claim 3 wherein the front and rear arm assemblies include parallel upper and lower links configured such that the mowing units are maintained at a desired orientation as the arm assemblies move up and down.

5. The apparatus of claim 1 wherein each mowing unit is provided by a rotary mower comprising a mower deck, a mower blade rotatably mounted under the mower deck about a blade axis extending down from the mower deck, and a mower drive operative to rotate the mower blade, and wherein each mower deck extends substantially horizontally rearward from the tool bar above the mower blade when the tool bar is in the operating position, and each mower deck extends upward from the tool bar when the tool bar is in the transport position.

6. The apparatus of claim 5 wherein each rotary mower comprises first, second, and third mower blades rotatably mounted under the mower deck about corresponding first, second, and third blade axes extending down from the mower deck, and when the tool bar is in the operating position the first and second blade axes are side by side an equal distance rearward of the tool bar and the third blade axis is forward or rearward of the first and second blade axes.

7. The apparatus of 1 wherein the third blade axis of a first rotary mower is forward of the first and second blade axes thereof, and the third blade axis of an adjacent second rotary mower is rearward of the first and second blade axes thereof.

8. The apparatus of claim 1 wherein each mowing unit is provided by a flail mower comprising a flail drum rotatably mounted about a drum axis oriented substantially horizontally and perpendicular to the operating travel direction when the tool bar is in the operating position, and a drum cover.

* * * * *